United States Patent [19]
Bevilaqua et al.

[11] Patent Number: 5,209,428
[45] Date of Patent: May 11, 1993

[54] PROPULSION SYSTEM FOR A VERTICAL AND SHORT TAKEOFF AND LANDING AIRCRAFT

[75] Inventors: Paul M. Bevilaqua, Santa Clarita; Paul K. Shumpert, Valencia, both of Calif.

[73] Assignee: Lockheed Corporation, Calabasas, Calif.

[21] Appl. No.: 521,211

[22] Filed: May 7, 1990

[51] Int. Cl.[5] ............................................. B64C 29/00
[52] U.S. Cl. ............................... 244/12.3; 244/23 D; 244/52; 244/12.5
[58] Field of Search ............... 244/12.3, 12.5, 23 B, 244/23 D, 52, 53 R; 60/242, 229, 224, 225

[56] References Cited
U.S. PATENT DOCUMENTS

| | | | |
|---|---|---|---|
| 2,918,232 | 12/1959 | Lippisch | 244/23 B |
| 2,988,301 | 6/1961 | Fletcher | 244/12.3 |
| 3,186,165 | 6/1965 | Edkins | 60/242 |
| 3,380,660 | 4/1968 | Markowski | 60/242 |
| 3,381,474 | 5/1968 | Gist | 244/12.3 |
| 3,907,219 | 9/1975 | Pharris | 244/12.5 |
| 4,326,686 | 4/1982 | Runge | 244/23 D |
| 4,474,345 | 10/1984 | Musgrove | 244/58 |
| 4,587,806 | 5/1986 | Madden | 244/12.5 |
| 4,660,767 | 4/1987 | Scrace | 244/12.5 |
| 4,791,783 | 12/1988 | Neitzel | 60/262 |

FOREIGN PATENT DOCUMENTS

| | | | |
|---|---|---|---|
| 2736120 | 2/1978 | Fed. Rep. of Germany | 244/12.3 |
| 1061397 | 3/1967 | United Kingdom | 244/12.3 |

Primary Examiner—Galen Barefoot
Attorney, Agent, or Firm—Louis L. Dachs

[57] ABSTRACT

The invention is a propulsion system for a V/STOL type aircraft. In detail, the invention comprises a turbofan engine including a fan section, compressor section, combustion section, turbine section and nozzle section. The turbine section comprises a low-pressure turbine portion coupled to and driving the fan section and a high-pressure turbine portion coupled to and driving the compressor section. A lift fan is coupled to the fan section by means of a drive shaft. A clutch is incorporated for decoupling the lift fan from the fan section. A mechanism is incorporated for extracting additional power from the low-pressure turbine portion of the turbine section to drive the lift fan that augments the basic engine thrust for V/STOL operation.

11 Claims, 4 Drawing Sheets

PROPULSION SYSTEM FOR A VERTICAL AND SHORT TAKEOFF AND LANDING AIRCRAFT

BACKGROUND OF THE INVENTION

The U.S. Government has a paid-up license in the invention and the right, in limited circumstances, to require the patent owner to license others on reasonable terms as provided for in a U.S. Government contract awarded by the United States Navy.

FIELD OF THE INVENTION

The invention relates to the field of propulsion systems and, in particular, to a propulsion system for vertical and short takeoff and landing (V/STOL) aircraft.

DESCRIPTION OF RELATED ART

The efficiency of a propulsion system for an aircraft is maximized when the velocity of the exhaust gases equals the forward velocity of the aircraft. Thus, during takeoff, landing and hovering it is obvious that a helicopter, which provides a small incremental velocity to a large mass of air, is more efficient than a jet aircraft, which provides a large incremental velocity to a small mass of air. However, a helicopter, because of its very large diameter rotor, has a limited forward velocity, certainly not much over two hundred miles per hour. Thus, most V/STOL aircraft are compromises. For example, the AV-8A Harrier V/STOL aircraft utilizes a turbofan engine for both hover and cruise propulsion. As with a helicopter, the large fan provides significant thrust for vertical lift in hover, but its correspondingly large frontal area increases the drag of the aircraft and limits its maximum speed to just barely above supersonic speed.

In U.S. Pat. No. 4,474,345 "Tandem Fan Series Flow VSTOL Propulsion System" by R.G. Musgrove, a jet engine with a small fan, which is capable of providing supersonic performance, is modified to provide vertical lift. The basic engine fan is split to provide fore and aft fans connected by means of a common drive shaft. The fans are centrally mounted in a duct located within the aircraft along its longitudinal axis. In normal wing borne flight (herein after referred to as normal flight), the fans operate in series with the fan exhaust mixing with the turbine exhaust and exiting through a nozzle located at the rear of the aircraft. In the vertical mode of operation, a diverter is positioned downstream of the forward fan and is movable to a position for diverting the exhaust from the forward fan downward relative to the longitudinal axis of the aircraft, while simultaneously opening an auxiliary inlet for permitting the introduction of air to the aft fan. An aft diverter is located in the nozzle which is also moveable to a position for diverting the exhaust from the aft fan and engine core downward. Thus, for vertical flight the diverters are actuated causing the exhaust from both fans and the core engine to be directed downward fore and aft of the center of gravity of the aircraft.

However, the tandem fan engine has less thrust in the vertcial takeoff and landing mode of operation than it has in the normal flight mode of operation. The thrust is larger in cruise because airflow passes through both fans, and thus, the core is supplied with air that is raised to a higher pressure level; whereas, in the vertical mode the core engine airflow passes through only the aft fan. Consequently, the tandem fan concept is not an efficient design for a V/STOL aircraft.

In U.S. Pat. No. 4,791,783 "Convertible Aircraft Engine" by R.E. Neitzel, a turbofan concept is disclosed for converting almost all the power used by the engine fan to shaft horsepower to drive a helicopter rotor. Guide vanes located on both sides of the outer portion of the engine fan can be actuated to block off air flow through the fan duct while still allowing air flow into the engine core. A gear mounted on the forward end of the fan shaft is coupled to a drive shaft which in turn drives the rotor. Such a system provides maximum efficiency during takeoff and landing and also during normal flight. However, if high speed flight is to be accomplished the rotor must be stopped (x-wing concept) or stopped and stored. The former concept severely limits the top speed of the aircraft, while the latter causes a severe weight penalty and requires a complex folding and storing system.

Thus, it is a primary object of the subject invention to provide a propulsion system for an aircraft.

It is another primary object of the subject invention to provide a propulsion system for V/STOL aircraft.

It is a further object of the subject invention to provide a propulsion system for supersonic V/STOL aircraft.

It is a still further object of the subject invention to provide a propulsion system for V/STOL aircraft having improved efficiency in both the takeoff, landing and supersonic flight modes.

An additional object of the subject invention is to provide a propulsion system for a V/STOL aircraft that is very efficient at high speeds and which has sufficient thrust during landing and takeoff.

SUMMARY OF THE INVENTION

The invention is a propulsion system for a V/STOL aircraft. In detail, the invention comprises a turbofan engine mounted within the airframe having the fan face coupled to the inlet duct. The engine is a mixed flow type having fan, high pressure compressor, combustion, turbine and exhaust nozzle sections. The turbine section includes a high-pressure turbine portion which drives the high pressure compressor section and a low pressure turbine portion which drives the fan section. The inner portion of the fan section is in front of the high pressure compressor section and, thus, acts as a low pressure compressor section. Since the fan section is connected by a first shaft to the low pressure turbine portion and the high pressure compressor is connected to the high pressure turbine portion by a hollow shaft rotatably mounted about the first shaft, they are often referred to as spools. Thus, in the turbofan engine thus far described, it is referred to as a two spool engine. Furthermore, the high pressure compressor section, combustion section and high pressure turbine portion are, collectively, referred to as the core or core engine.

In this type of engine, the turbine exhaust produces a significant portion of the total thrust thereof and, preferably, has a common fan and turbine exhaust nozzle section exiting (mixed flow) at the rear of the aircraft when operated in the normal flight mode. The exhaust nozzle section is designed to divert exhaust flow either horizontally for normal flight or vertically downward for takeoff and landing, and intermediate positions therebetween when transferring from vertical to horizontal flight and visa versa. A vertically mounted lift fan assembly, having a lift fan rotor, is positioned forward of the engine and connected by a drive shaft to the front of the engine fan. A clutch is mounted in the drive line between the lift fan assembly and engine for disconnecting the lift fan rotor from the engine. Power to drive the lift fan rotor is obtained by increasing the engine core exhaust nozzle area( exhaust nozzle section exit cross-sectional area). This allows more power to be extracted from the turbine exhaust during V/STOL operation. The excess power is absorbed by the lift fan rotor which is "clutched in" during takeoff and landing and the transition to and from normal flight. By doing so, the operating point of the engine is shifted so that more power is applied to the lift fan rotor which is more efficient at these lower speeds. The lift fan exhaust duct assembly is equipped with a vectoring system to deflect the thrust from a vertical direction in vertical flight to an aft vectoring direction during transition to and from normal flight. After transitioning to horizontal flight, the operating point of the engine is returned to its normal cruise mode of operation which is more efficient at higher speeds.

To control the power extracted from the low-pressure turbine section, a mechanism is provided for varying the exhaust nozzle exit cross-sectional area. Depending on the particular design of the turbofan, it may be desirable to add one or more additional turbines to the low-pressure turbine section in order to extract the additional power. It is important to note that only the low-pressure turbine section will sense the reduction in back pressure caused by an increase in nozzle exit cross-sectional area; thus, the high-pressure turbine portion driving the high-pressure compressor section will sense little or no decrease in back pressure.

If the engine is operated during normal flight as a mixed flow turbofan engine, it can also be operated as a separate flow engine in the vertical flight mode of operation by blocking off the fan duct with a plurality of doors which divert the fan section exhaust to roll control nozzle assemblies. The roll control nozzle assemblies consist of a pair of ducts which connect to the fan duct aft of the fan section and extend outward therefrom, terminating in downward directed variable cross-sectional area roll control nozzles. Valves located in the ducts at the fan section duct wall open to admit fan exhaust to the individual roll control nozzle assemblies which are differentially controlled to develop roll control forces. Pitch axis control power for the aircraft in the vertical and transitional flight regimes is achieved by thrust modulation between the lift fan assembly and the engine core turbine exhaust. This is accomplished by variable inlet guide vanes located just upstream of the lift fan rotor and the variable cross-sectional area exhaust nozzle section. As the angle of the inlet guide vanes are varied, the power to drive the lift fan rotor is varied. Alternatively, the lift fan assembly nozzle cross-sectional area may be varied to provide the same effect. Changing the thrust produced by the lift fan rotor requires that the power extracted by the low pressure turbine portion to correspondingly change. This, of course, can be accomplished by changing the nozzle section exit cross-sectional area. While modulating the lift fan rotor and engine core exhaust thrust levels for pitch control, the sum of these thrusts remain essentially constant.

Thus, for takeoff the lift fan rotor is "clutched in" and the engine exhaust nozzle assembly is positioned to divert the exhaust downward and the nozzle section exit cross-sectional area is increased so that additional power is extracted from the turbine exhaust by the low-pressure turbine section and applied to the fan section and lift fan rotor. Therefore, the fan section to core airflow ratio (commonly called the engine bypass ratio) will have been increased significantly resulting in a higher thrust-to-horsepower specific ratio. After takeoff, the exhaust nozzle section is adjusted back to a position where the exhaust is directed along the longitudinal axis, which is accomplished slowly as the aircraft gains speed. The operating point of the engine is returned to its normal position, when the fan rotor is de-clutched, by decreasing the nozzle section cross-sectional area. The actual transition points, rates of nozzle cross-sectional area change and nozzle diversion angle change, etc. will vary with the design of the particular aircraft and engine used.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a planform view of a V/STOL aircraft incorporating the subject propulsion system.

Illustrated in FIG. 2 is a cross-sectional view of the aircraft shown in FIG. 1 taken along the line 2—2, particularly illustrating the subject propulsion system.

Figure 2:
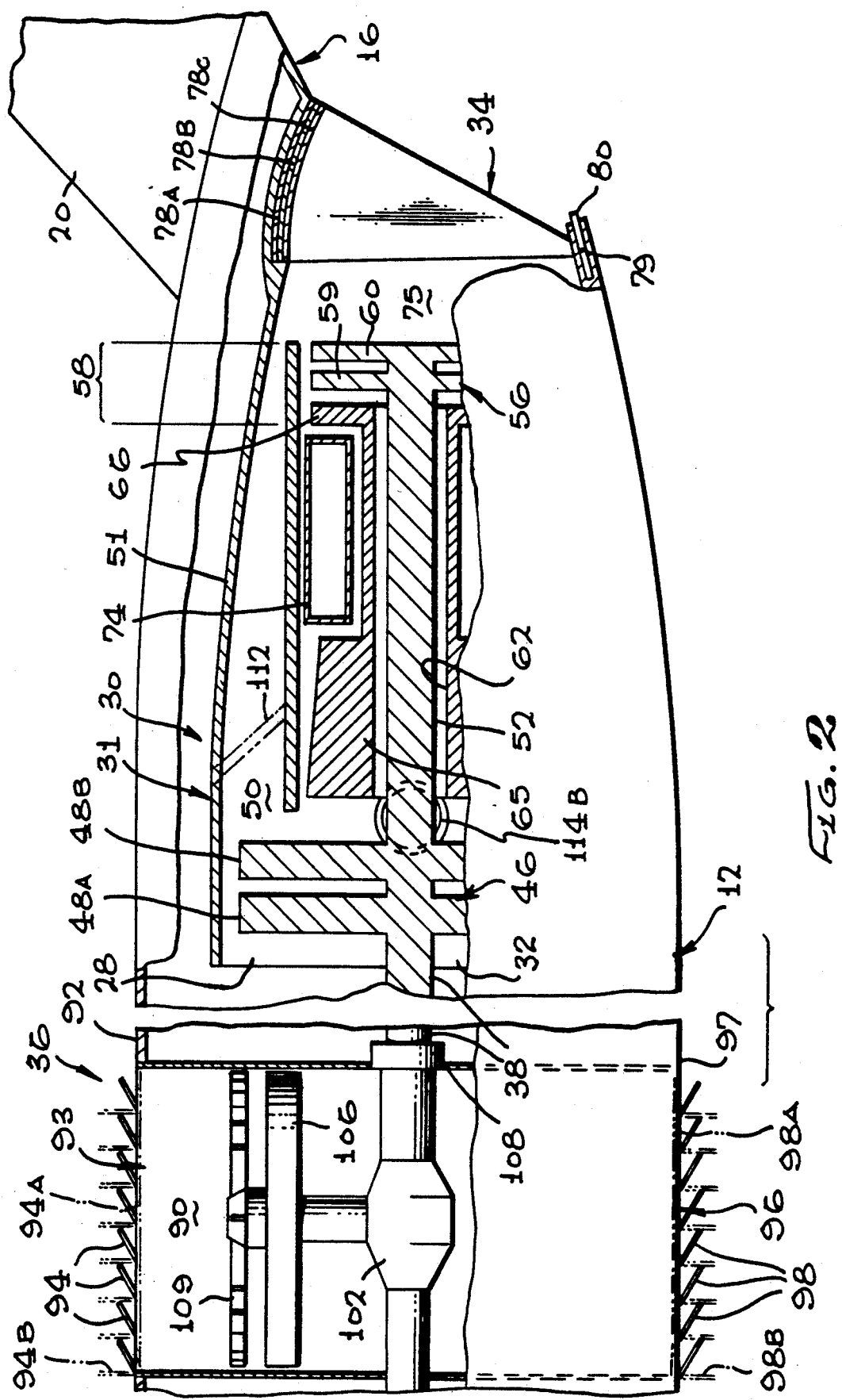
Figure 3:
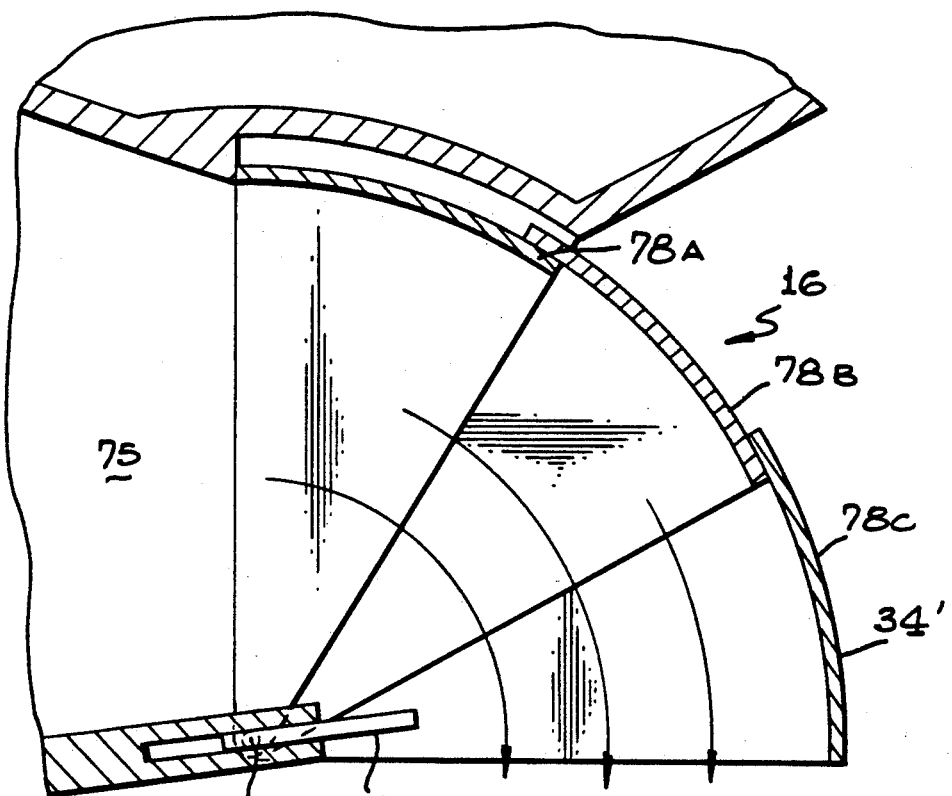

Illustrated in FIG. 3 is an enlarged view of the nozzle section of the propulsion system shown in FIG. 2.

Figure 1:
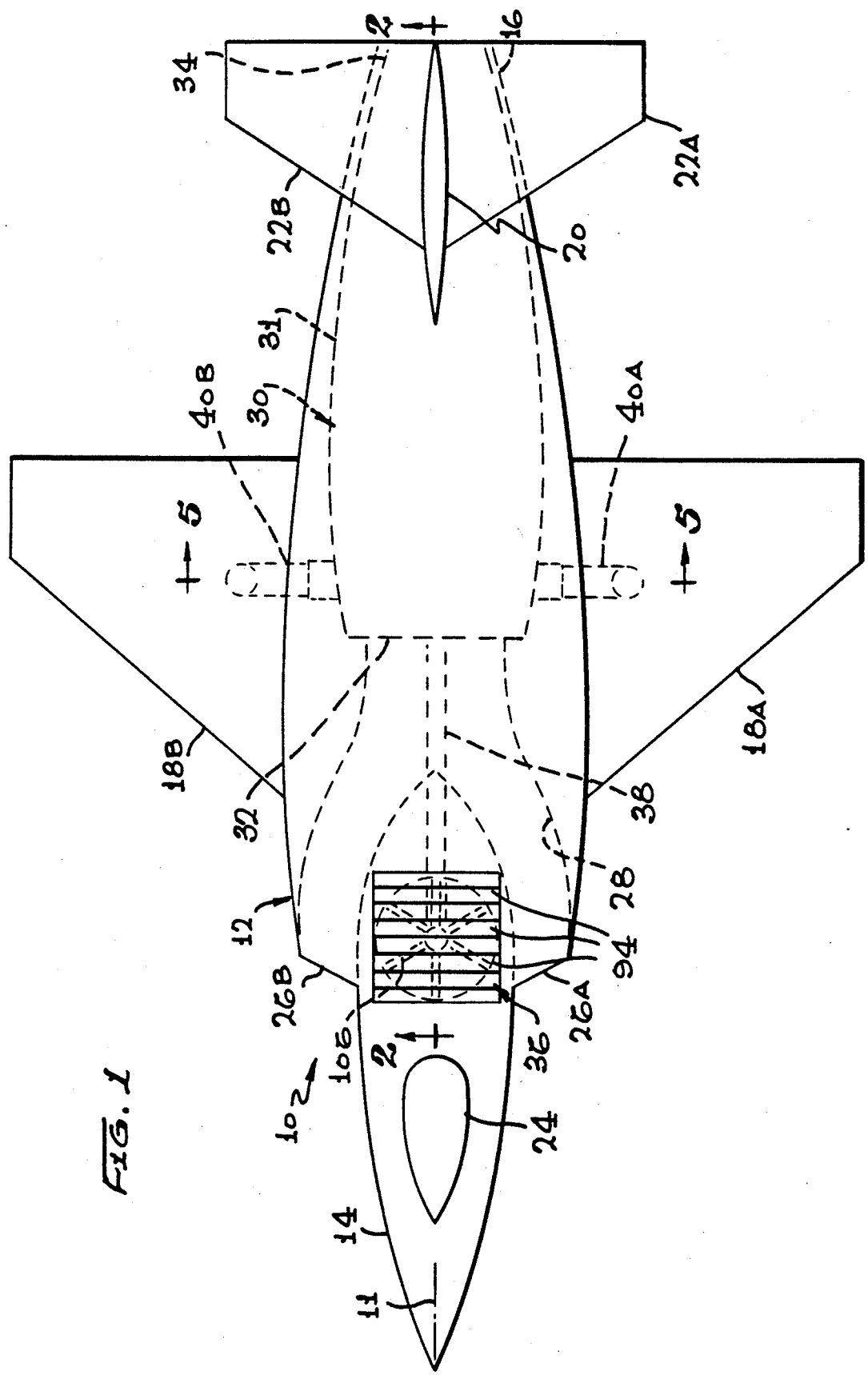
Figure 4:
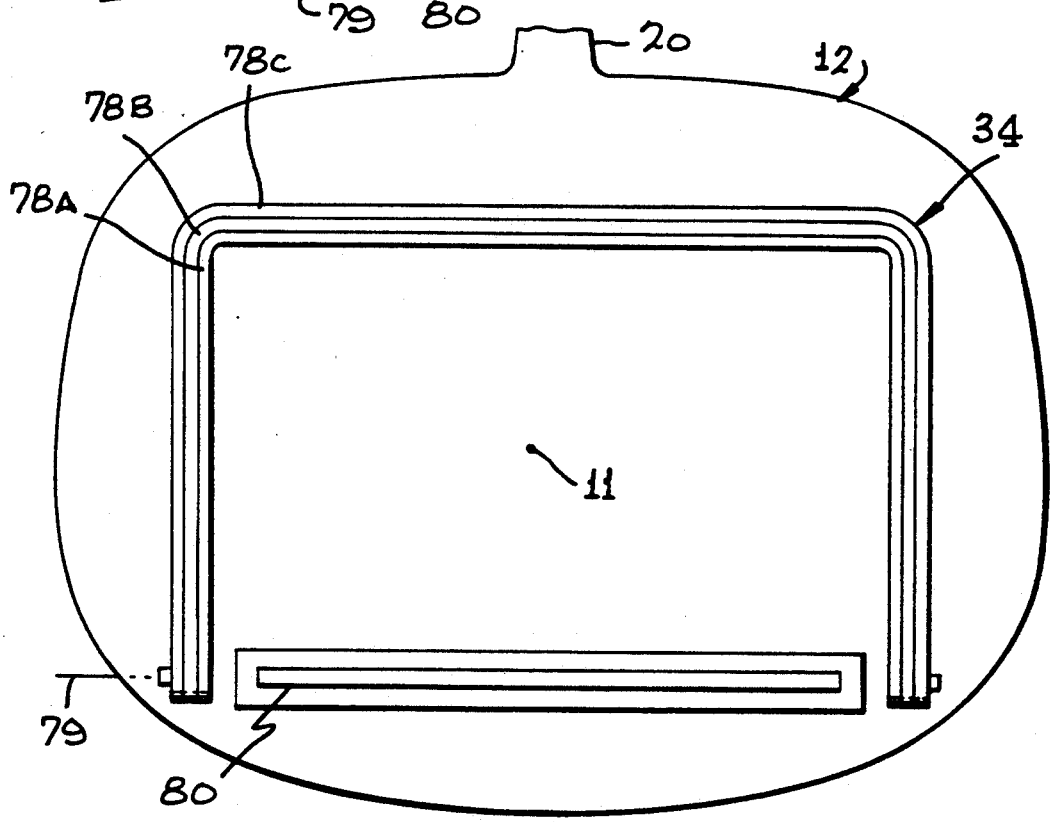

Illustrated in FIG. 4 is a view looking forward from the rear of the propulsion system shown in FIG. 1.

Figure 5:
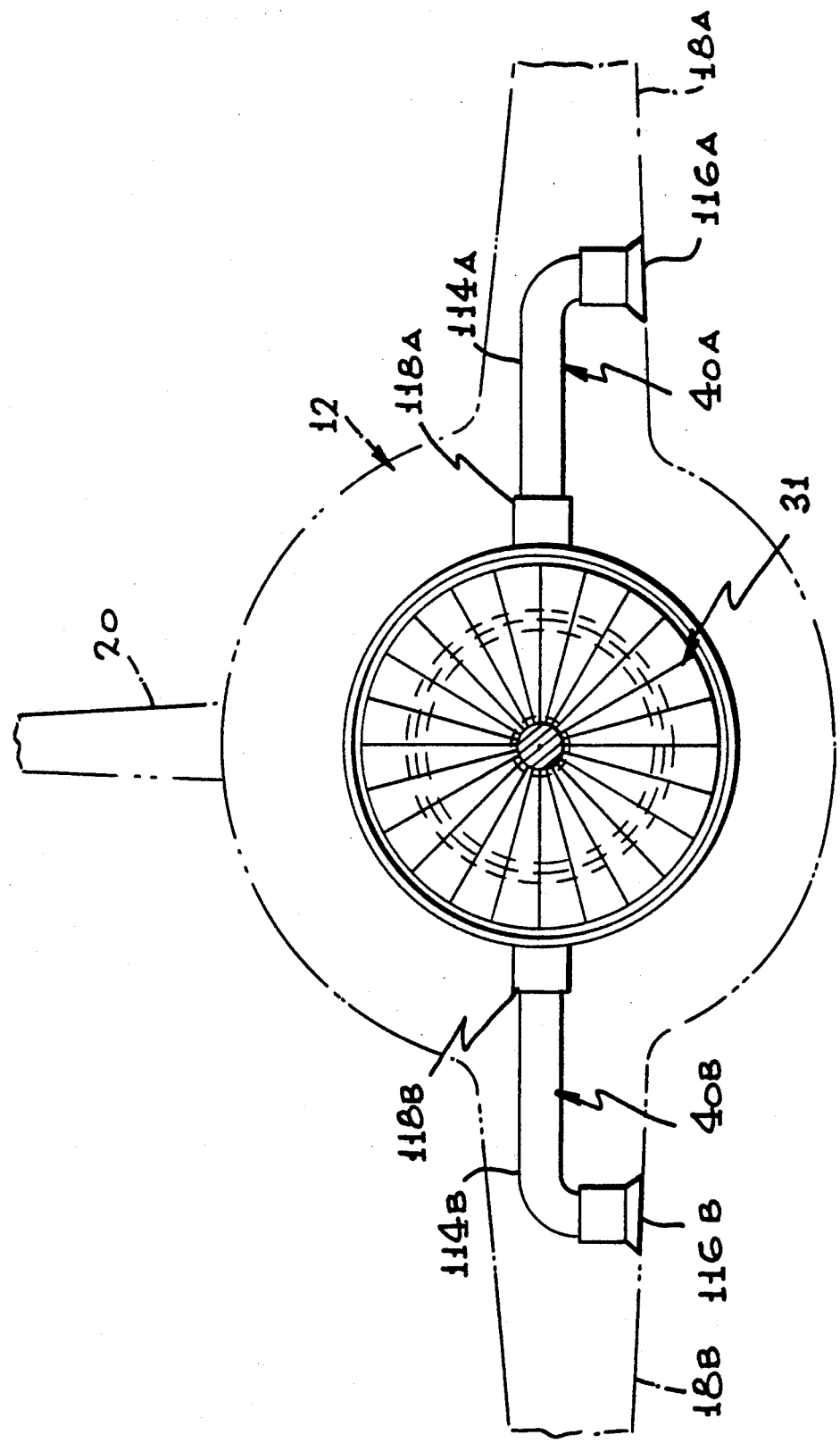

Illustrated in FIG. 5 is a cross-sectional view of the aircraft shown in FIG. 1 taken along the line 5—5.

DESCRIPTION OF PREFERRED EMBODIMENT

Illustrated in FIG. 1 is a conventional V/STOL type aircraft, generally indicated by numeral 10, having a longitudinal axis 11. The aircraft 10 includes a fuselage 12 with a nose 14, tail 16, wings 18A and 18B, vertical stabilizer 20, and horizontal stabilizers 22A and 22B. Other features include a cockpit 24, engine inlets 26A and 26B which join to form an engine inlet duct 28. The subject propulsion system, generally indicated by numeral 30, includes a turbofan engine 31 having an inlet 32 in communication with duct 28 and an exhaust nozzle section 34 at the tail 16. The turbofan engine 31 is coupled to a vertically mounted lift fan assembly 36 by means of a drive shaft 38. Additionally illustrated are control nozzle assemblies 40A and 40B which are coupled to the engine 30 and exit to either side of fuselage 12 on the under side of the wings 18A and 18B, respectively. A further explanation of the function of the roll control nozzle assemblies 40 will be subsequently provided.

Illustrated in FIG. 2 is a partial cross-sectional view of the aircraft shown in FIG. 1 particularly illustrating the propulsion system 30. As previously stated, the propulsion system 30 includes the turbofan engine 31, and as depicted it is a two-spool mixed flow type wherein the fan and turbine exhausts are mixed together in a common duct and exit through a common nozzle.

In detail, the engine 31 includes a fan section 46 comprising fans 48A and 48B located within a fan duct 50 defined by a cylindrical wall 51. The fans 48A and 48B are attached to a rotatably mounted drive shaft 52 and also to drive shaft 38. The opposite end of the drive shaft 52 is attached to a low-pressure turbine portion 56 of a turbine section 58. The low-pressure turbine portion 56, for purposes of illustration, incorporates two turbines 59 and 60. However, as will be subsequently discussed, in some instances only one or more than two may be necessary.

Rotatably mounted about the drive shaft 52 is a hollow drive shaft 62 attached at one end to a high-pressure compressor section 65 and at its opposite end to a high-pressure turbine portion of turbine section 58 and as illustrated comprising a single turbine 66. A combustion section 74 is positioned between the high-pressure compressor 65 and high-pressure turbine 66. The fan section 46 and turbine section 5B exhausts join together within a common duct portion 75 and exits out the exhaust nozzle section 34 during the normal flight operation. The high pressure compressor section 65, combustion section 74 and turbine section 58 is typically called the core.

The exhaust nozzle section 34 is designed to divert the exhaust from a horizontal direction aligned with the longitudinal axis 11 (best seen in FIG. 1) for normal flight to a vertically downward direction (90 degrees) for takeoff and landing. Still referring to FIG. 2 and additionally to FIG. 3, which is an aft view of the aircraft shown in FIG. 1, it can be seen that the nozzle section 34 includes a plurality of rectangular telescoping sections 78A, 78B and 78C rotatably mounted at their ends about a pivot point 79. Thus, when the nozzle is retracted, it has a generally rectangular shaped cross-section and when extended, indicated by numeral 34', diverts the exhaust 90 degrees to a downward direction. Such nozzles are old in the art and thus, need not be discussed in further detail.

An extendable and retractable slidable plate 80 is located at the bottom of the nozzle section 34. When the telescoping sections 78A-C are extended during takeoff and landing the nozzle section cross-sectional area can be varied by moving the plate 80 either inward or outward and in so doing varies the back pressure within the common duct portion 75 of the duct 50. Since the flow is subsonic within the common duct 75, the power extracted from the engine core exhaust by the low-pressure turbine portion 56 is a function of the pressure differential and the associated temperature change across the low-pressure turbine portion 56. Furthermore, the pressure and temperature of the combustion products leaving the combustion section 74 and passing through the high pressure turbine 66 and entering the low-pressure turbine portion 56 is constant for a specific engine power setting; thus, power extraction increases as the pressure in duct 75 is reduced. The decrease in back pressure has little or no effect on the high-pressure turbine 68, thus, there is no effect on the compressor section 65. The additional power extracted from the turbine exhaust by the low-pressure turbine portion 56 is applied to the lift fan section 36 as now described.

Primarily referring to FIGS. 1 and 2, it can be seen that the lift fan assembly 36 comprises a vertical duct 90 which extends from the top 92 of the aircraft, having an entrance 93 covered by a plurality of moveable doors 94, and an exit 96 at the bottom 97 of the aircraft, covered by a plurality of doors 98. The doors 94 and 98 are moveable from fully retracted positions, indicated by numerals 94A and 98A, during normal flight to fully opened positions, indicated by numerals 94B and 98B, for takeoff and landing. Mounted within the duct 90 is a gearbox/transmission assembly 102 coupled at one end to a lift fan rotor 106 and to the shaft 38 at the other end via a clutch 108. A set of variable inlet guide vanes 109 are mounted on top of the lift fan rotor 106 which are used to control the power extracted therefrom. Thus, with the clutch 108 engaged, any additional power extracted from the engine 31 low-pressure turbine portion 56 is applied to the lift fan rotor 106.

In the vertical mode of operation, the engine 31 can operate in a separate flow cycle mode allowing the engine fan section 46 bypass airflow to be routed to nozzles located in the aircraft's wings 18A and 18B to produce reaction roll control power. Still referring to FIG. 2 and additionally to FIG. 5, which is a cross-sectional view of FIG. 1 taken along the line 5—5, showing the left and right roll control assemblies 40A and 40B, respectively, it can be seen that the fan section 46 exhaust can be blocked off by a plurality of doors 112. These doors 112, which are mounted on the duct wall 51 are moveable inwardly so as to block off the fan section 46 exhaust. Left and right roll control ducts 114A and 114B, respectively, are connected to the duct wall 51 just downstream of the fan 48B and extend outward from the longitudinal axis 11 and terminate in left and right downward directed variable cross-sectional area roll control nozzles 116A and 116B, respectively. Control valves 118A and 118B control the flow into the ducts 114A and 114B, respectively, while nozzles 116A and 116B control the rate of flow for roll control.

Thus, the vertical or short takeoff procedure would begin with the starting of the engine 30. The nozzle section 34 is adjusted such that the turbine exhaust is directed downward, the clutch 108 is engaged, the doors 94 and 98 are positioned in the fully opened positions 94B and 98B. The doors 112 are extended so that the fan section 46 exhaust is diverted to the roll control nozzle assemblies 40A and 40B and the control valves 118A and 118B are opened. The slidable plate 80 is adjusted so that the engine operating point is shifted such that more power is extracted by the turbine portion 56 (turbines 59 and 60) which is transferred to the fan section 46 and lift fan assembly 36; however, the additional power is only absorbed by the lift fan rotor 106. As engine power is increased, the aircraft will gain altitude on the thrust from the lift fan rotor 106, fan section 46, whose exhaust is diverted to the roll control nozzles 116A and 116B and also from the turbine exhaust exiting out of the nozzle section 34.

Thus, it is readily apparent that the engine has a selectable operating point wherein a portion of the power generatable by the low-pressure turbine, at a selected operating power setting, is extracted to drive the fan section. Furthermore, the means to shift this selectable operating point of the engine to a second operating point, at the selected power setting, increasing the power extracted by the low-pressure turbine portion of the turbine section such that additional power extracted thereby is also applied to the fan section without changing the selected power setting, can comprise: a) a means to change the cross-sectional exit area of the nozzle section changing the back pressure aft of the turbine section; or means to divert the fan section exhaust from the nozzle section; or a combination of both. Note that all of these means to shift the operating point are located aft of the fan section. The fan section continues to produce thrust even during shifting from the first to the second operating point of the engine at a selected power setting. Furthermore, when the lift fan is clutched in, the thrust produced by the fan section remains constant because the additional power is absorbed by the lift fan.

An added benefit of diverting the fan section 46 exhaust is that the back pressure in the common duct portion 75 is further reduced; thus, this feature can be used in conjunction with the slidable plate 80 to control the power extracted by the low pressure turbine portion 56 of the turbine section 58. In fact, in some instances, it maybe possible to modulate the doors 112 and valves 118A and 118B to control the back pressure in the common duct portion 75 so that the need for the slidable plate 80 is eliminated.

The pitch of the aircraft is controlled by use of the variable inlet guide vanes 109, which can be used to control the airflow to the lift fan rotor 106 and, thus, raise or lower the thrust produced thereby. These guide vanes are used in conjunction with the slidable plate 80 which appropriately controls the power extracted from the low pressure turbine portion 56 so as to match the power requirements of the lift fan rotor 106. While modulating the thrust produced by the lift fan rotor 106 and the power extracted from the turbine exhaust of the engine core, the total sum of the thrust of the lift fan assembly and exhaust nozzle section remains essentially constant.

After sufficient altitude is reached, the telescoping sections 78A, 78B and 78C are slowly retracted allowing the turbine exhaust to move toward alignment with the longitudinal axis 11 of the aircraft producing a forward thrust. The lift fan exit doors 98 are also rotated aft toward the partially closed position to vector the exhaust thrust rearward. These doors 98 and telescoping sections 78A-C are modulated to control the resultant thrust at the desired angle as a function of aircraft forward speed during transition to normal flight. After sufficient aerodynamic lift is produced to maintain the altitude of the aircraft, the lift fan assembly 36 is declutched, lift fan doors 94 and 98 are closed (to positions indicated by numerals 94A and 98A), the doors 112 are retracted, valves 118A and 118B are closed, the telescoping sections 78A, 78B and 78C are fully retracted and the slidable plate 80 is repositioned so that the engine operating point is returned to its cruise mode of operation. For vertical or short landing the procedure is reversed.

While the invention has been described with reference to particular embodiment, it should be understood that the embodiments is merely illustrative as there are numerous variations and modifications which may be made by those skilled in the art. Thus, the invention is to be construed as being limited only by the spirit and scope of the appended claims.

INDUSTRIAL APPLICATION

The invention has application in the aircraft industry and, in particular, to industries making propulsion systems for aircraft.

I claim:

1. A propulsion system for a V/STOL aircraft comprising:
   a turbofan engine including a fan section, a compressor section, a combustion section, turbine section and nozzle section, said turbine section having a low-pressure turbine portion coupled to and driving said fan section and a high-pressure turbine portion coupled to and driving said compressor section, said engine having a selectable operating point wherein a portion of the power generatable by said low-pressure turbine at a selected operating power setting is extracted to drive said fan section;
   a lift fan;
   a drive shaft means coupling said fan section to said lift fan;
   clutch means for detachable coupling said fan section to said lift fan; and
   means to shift said selectable operating point of said engine to a second operating point at the selected power setting increasing the power extracted by said low-pressure turbine portion of said turbine section;
   such that power extracted by said low-pressure turbine portion and applied to said fan section can be increased without changing the selected power setting.

2. The system as set forth in claim 1 wherein said engine is a mixed flow engine wherein said fan section and said turbine section exhausts both exit said nozzle section.

3. The system as set forth in claim 2 wherein said nozzle section includes means to divert the exhaust from said turbine section and said fan section from a direction generally aligned with the longitudinal axis to a generally vertically downward direction.

4. The system as set forth in claim 3 wherein said means to shift said selectable operating point of said engine is a means to change the cross-sectional exit area of said nozzle section changing the back pressure aft of said turbine section.

5. The system as set forth in claim 4 wherein said means to shift said selectable operating point of said engine includes means to divert said fan section exhaust from said nozzle section.

6. The system as set forth in claim 3 wherein said means to shift said selectable operating point of said engine includes both means to change the cross-sectional exit area of said nozzle section and means to divert said fan section exhaust from said nozzle section, reducing the back pressure aft of said turbine section.

7. The system as set forth in claim 5 or 6 wherein said means to divert the fan section exhaust from said nozzle section diverts said fan section exhaust to roll control nozzles.

8. The system as set forth in claim 7 further including means to vary the thrust produced by said lift fan.

9. The system as set forth in claim 1 wherein said means to shift said selectable operating point of said engine to a second operating point at the selected power setting is positioned behind said fan section.

10. The system as set forth in claim 9 wherein said fan section continues to produce thrust, when said means to shift said selectable operating point of said engine to a second operating point at the selected power setting shifts said selectable operating point.

11. The system as set forth in claim 10 wherein, with said lift fan clutched in, the thrust produced by said fan section remains constant when said means to shift said selectable operating point of said engine to a second operating point at the selected power setting shifts said selectable operating point.

* * * * *